United States Patent [19]

Regnault et al.

[11] Patent Number: 4,809,040

[45] Date of Patent: Feb. 28, 1989

[54] SINGLE TONER COLOR IMAGE DISPLAY APPARATUS AND METHOD

[76] Inventors: Alain J. Regnault, 4 Rue Des Tartres; Didier Auray, 5 Rue des Tartres, both of Rueil-Malmaison 92500, France

[21] Appl. No.: 44,584

[22] Filed: Apr. 30, 1987

[30] Foreign Application Priority Data

Apr. 30, 1986 [FR] France ................................ 86 06255

[51] Int. Cl.[4] ...................... G03G 15/00; G03G 15/01; G03B 27/52; G01D 15/06

[52] U.S. Cl. ...................................... 355/5; 355/3 BE; 355/4; 355/30; 346/153.1

[58] Field of Search ....................... 346/157, 21, 153.1; 355/5, 3 BE, 4, 3 DD, 30; 118/654

[56] References Cited

U.S. PATENT DOCUMENTS

| | | | |
|---|---|---|---|
| 2,919,170 | 12/1959 | Epstein | 355/3 DD |
| 3,069,681 | 12/1962 | Sloan | 355/5 |
| 4,322,734 | 3/1982 | Ebi et al. | 346/153.1 |
| 4,693,951 | 9/1987 | Takasu et al. | 346/153.1 |

FOREIGN PATENT DOCUMENTS

| | | | |
|---|---|---|---|
| 223161 | 12/1983 | Japan | 355/5 |
| 42578 | 3/1984 | Japan | 355/5 |
| 229578 | 12/1984 | Japan | 355/4 |
| 115958 | 6/1985 | Japan | 355/4 |
| 203967 | 10/1985 | Japan | 355/4 |

*Primary Examiner*—A. T. Grimley
*Assistant Examiner*—Ed Pipala
*Attorney, Agent, or Firm*—Klauber & Jackson

[57] ABSTRACT

A system for displaying graphic or pictorial intelligence, including half tones and the like. The system includes an endless belt having an electrically insulating externally facing surface; an electrostatic charge writing head for depositing an electrostatic charge pattern on said belt in correspondence to a desired image to be formed thereupon; a developing station for depositing toner upon said electrostatic image to render same visible; means to move said belt past said imaging and development stations and to a viewing position whereat said display may be seen by a user; and a casing enclosing said belt, writing head, and developing station, one side of the casing being provided with a transparent wall to enable the developed image to be perceived by the user.

10 Claims, 1 Drawing Sheet

SINGLE TONER COLOR IMAGE DISPLAY APPARATUS AND METHOD

BACKGROUND OF INVENTION

The present invention relates to a display system and method which enables the user to display in large dimensions on a re-usable support, graphics such as line drawings, and also photographic reproductions having variations of image intensity, e.g. half-tones. The system and method is applicable to black and white or color.

When it is desired to display commercial or informative graphics or photographic matter, it usually requires a support on which the material to be advertised in glued or attached.

Another common technique is to use mechanical display, but these will only include letters or digits, excluding all graphics or pictures; and usually this is in one color only. One of the other commonly used procedures consists of using multiple colored light bulbs, or LED's, but the cost of such a system is high if one wants good definition, i.e. the luminance would not be strong enough to provide strong contrasts when such displays are directly exposed to direct light.

One object of the present invention is to provide a continually re-usable support for the display, and to be able to receive and "print" characters, drawings or color/monochrome pictures, the entire display being readily visible even in direct sunlight.

Another object of the invention is to permit the use of the same support to display as many subjects as desired without having to remove an old sheet or the like and attach a new one.

A still further object of the invention is to provide a display system which can be fed with iconographic documents electrically encoded, by means of a telephone line, leased line, radio transmission or satellite transmission, enabling a computer center to feed and manage the displays which can be distributed over a geographic area, the size, and the number of subjects to be displayed being in accordance with the location and the hour of the day.

BRIEF DESCRIPTION OF THE DRAWINGS

The invention is diagramatically illustrated, by way of example, in the drawings appended hereto, in which.

DESCRIPTION OF PREFERRED EMBODIMENT

Figure 1:
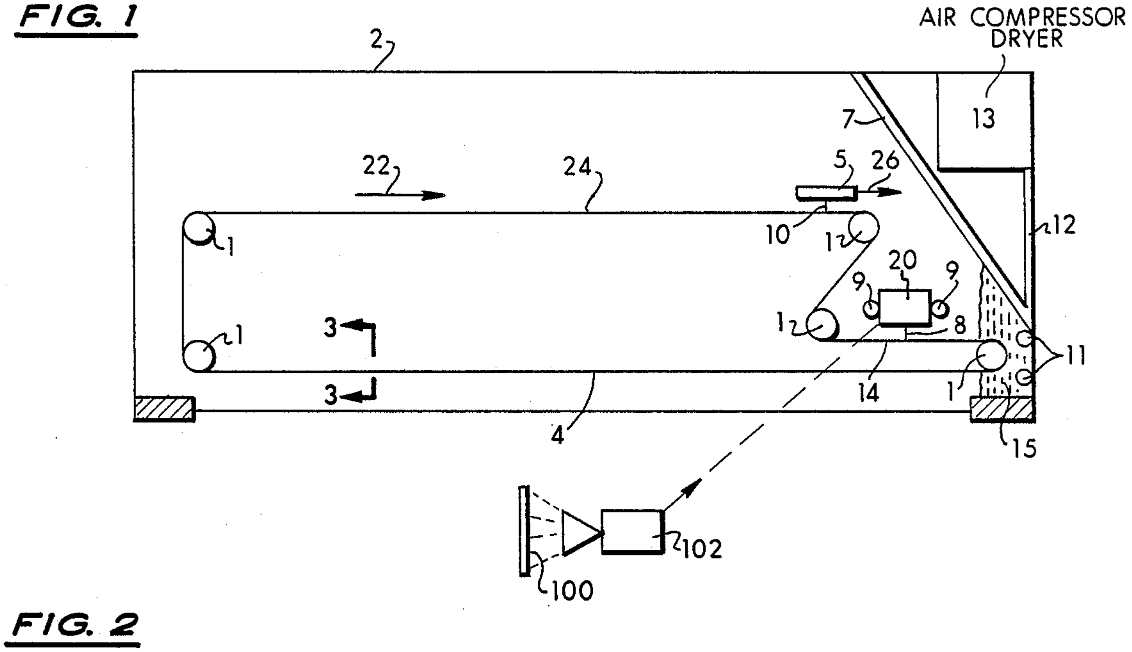
FIG. 1 is a side elevational view, in schematic cross-section, of apparatus in accordance with the invention.
Figure 2:
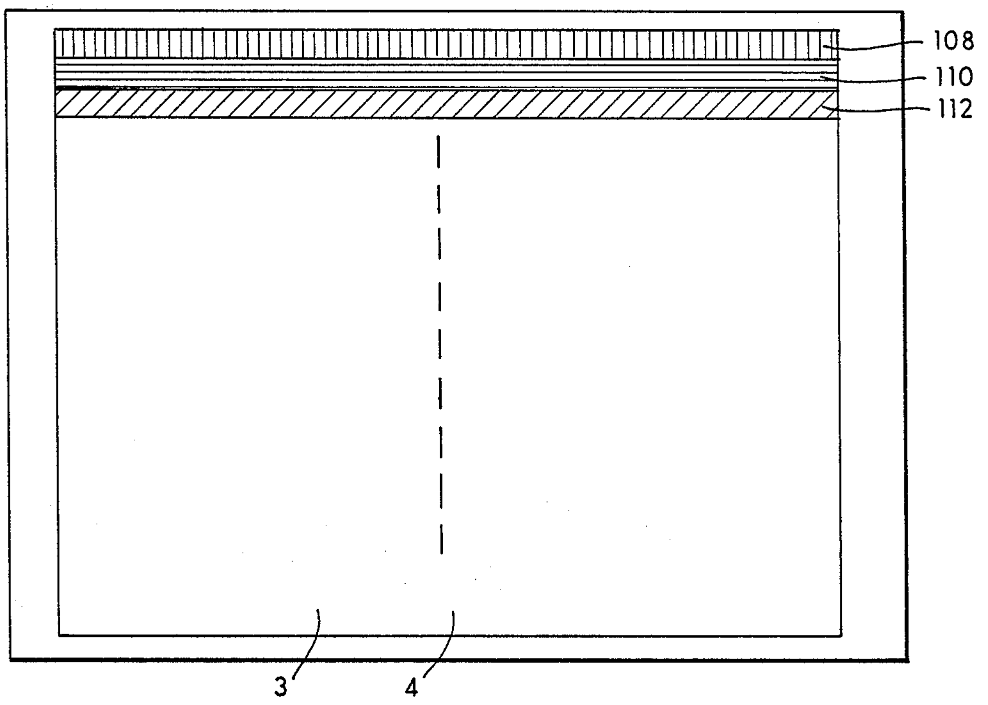
FIG. 2 is a front plan view thereof.

In a preferred embodiment, and according to FIGS. 1 and 2:

A support 4 of iconographic documents or text, of which the width dimension is "n" feet, and the vertical dimension "m" feet, has its ends secured or formed together, so this support appears as an endless band, or belt. Belt 4 is supported by a plurality of axles 1, of which at least one is motorized so that belt 4 can move in direction 22.

An electrode 8 which provides the electrostatic charge pattern on the insulated belt or support 4, is carried by carriage 20 moving along one or two axles, from one side to the other and back. The magnitude of these charges is determined by the value of the luminance of the document to be displayed, the luminance of which is electronically translated.

Figure 3:
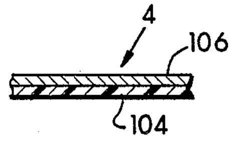
FIG. 3 is a cross-sectional view of the belt support in FIG. 1, taken along line 3—3 thereof.

The movement of the carriage 20, is synchronized to the movement of the support 4. The support 4 is made from an insulated or dielectric material 104, covered on non-covered with a conductive metallic material or coating 106 on the face opposed to the display side which is electrostatically charged as shown in FIG. 3. This support material can be a metalized "Mylar" which is used for the plastic capacitor manufacturing.

Once the charge pattern has been deposited upon the support or belt 4, the belt passes into a colored particle (toner) bath 15, which is fluidized by the means of air under pressure injected in the bath through underlying pipes 11. The support 4 upon proceeding out of the bath, will retain the colored toner particles with a density which is a function of the electrostatic charge carried by the support, and thereby of the electrical signal which represents the iconographic document analyzed line after line. The tone is preferably an explosion-proof toner.

An identical image to the originally scanned image 100 by scanning apparatus 102, will thereby be reproduced on the support 4, with a scale dependent on the size of the initial document and the document displayed on the support.

It will be clear that the colored toner particles and the support 4 color have to be different in color and in luminance, to allow good visual contrast in the perception of the document displayed.

When it is desired to display a new document, the support is moved a distance "x", so that the old and the new document are separated by a neutral display zone. When the face of the support previously charged by the particles rolls over the other side of the visible face (i.e. to region 24) a horizontal electrode 10 going from one side to the other, deposits opposite polarity electrostatic charges intended to eliminate the single polarity charges which retained the toner particles, so that the particles are neutralized. Since the normal downward direction of the apparatus is as shown by arrow 26, the neutralized toner particles fall down into the bath or reservoir 15, located at the lower part of the image support 4 to be re-used.

In the Figures

1. Show the motorized axles.
2. The cabinet of the complete system.
3. Transparent material for protection.
4. Image support or belt.
5. Isolated electrode support.
7. Inclined surface for delivering the discharged toner particles into the bath or reservoir.
8. Charge or writing electrode.
9. Axles guiding the carriage 20.
10. Alternative charge ionization electrode for charge neutralization.
11. Air pipes blowing the air into the toner particle bath.
12. Pipe conducting the air from the compressor-dryer to the blowing pipes.
13. Air compressor dryer for providing dry air into the cabinet at a slight positive pressure.
14. Electrostatic imaging zone.
15. Colored particles (toner reservoir, i.e. developing station.
20. Carriage carrying the charge (writing) electrode.

In the Figures, the arrow 22 (actually pointing downward) shows the moving direction of the image support.

This image display system can be fed by images electrically encoded, according to one of the C.C.I.T.T. codes, or oner of the codes used by the pictures press transmission, or a code tailored for this specific use.

The electrode 8 can be replaced by a plurality of electrodes, each providing a different charge, so many line can be drawn at a time in order to accelerate the document visualization.

If a color image is desired the image support will be covered with many colored stripes which are parallel to the moving direction of theimage support, only three stripes being shown for simplicity in FIG. 2. These colored stripes 108, 110 and 112 are blue, red and green (the primary colors, respectively, and are shown in enlarged scale in FIG. 2). These three color sequences are repeated from the left to the right side of the image support. Those stripes can be fixed or printed upon the support. The width of those stripes is such that an observer having normal vision and located at a standard distance from the support, will be unable to distinguish those stripes. The observer will see a color which will tend to the white, according to the synthesis of the three primary colors.

An apparatus having sensitive opto-electronic cells appropriate to respond to the three basic colors, is linked to the carriage carrying the electrostatic charge electrode. Thus, it is possible to know the pixel color which is charged by the electrode, when the carriage is moving from one side of the image support to the other.

The electrical coded signal representing the document to be disposed, analyzes this document line after line. The electrical signal representing the first pixel is the blue luminence of this pixel; the electrical signal representing the second pixel is the green luminance of this pixel; the electrical signal representing the third pixel is the red luminance of this pixel; and so on.

By such means an electrostatic charge may be deposited on each colored pixel, the charge density of which is inversely proportionally to the luminance value of the corresponding pixel belonging to the scanned document. Thus to a high luminance a low electrostatic charge is deposited, whereby a low quantity of dark power is retained, and the reflected light is high; while to a low luminance a high electrostatic charge is imparted, so that a high quantity of dark toner power is retained, and the reflected light is low. Therefore the reproduction of the document on the display surface is effected according to the color and the luminence of the scanned document. A "gamma" correction has to be applied, respecting the color reproduction.

Thanks to this process, the advantages are numerous, and particularly:

One dark color toner power is used, instead of three.

Only one re-usable support image is needed.

A perfect compatibility between the color display and the black and white display, for pictures or graphics, is enabled.

For practical reasons, the display support can carry an alternation of colored dots: red, green, and blue; or any other order, instead of stripes.

These dots can be circular, rectangular or otherwise. Therefore, the color alternation has to be not only vertically oriented but also horizontally.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed and limited only by the scope and spirit of the claims now appended hereto.

We claim:

1. A system for displaying graphic or pictorial intelligence, including half tones and the like, comprising:

an endless belt having an electrically insulating externally facing surface;

electrostatic charge writing head means for depositing an electrostatic charge pattern on said belt in correspondence to a desired image to be formed thereupon;

developing station means for depositing toner upon said electrostatic image to render same visible;

means for moving said belt past said writing head means and said developing station means and to a viewing position whereat said display may be seen by a user;

an electrostatic charge erasing station including electrode means for depositing charge to neutralize the previously formed charge pattern on said belt so as to enable said previously formed charge pattern to be readily removed from the belt;

a casing surrounding said belt, writing head means and developing station means, said casing including a transparent wall at said viewing position to enable said developed image to be viewed by the user;

means for filling said casing with a gas having a slight overpressure in comparison to atmospheric pressure; and means for drying said gas.

2. A system in accordance with claim 1, wherein said electrostatic charge pattern corresponds to a scanned original document.

3. A system in accordance with claim 1 wherein the said belt is formed of a dielectric material, the side opposing the imaging surface being provided with a metallic coating.

4. A system in accordance with claim 1 wherein the toner comprises an explosion-proof powder.

5. A method for imaging a display upon the externally facing surface of a movable dielectric belt, comprising the steps of:

moving said belt past a writing station;

depositing an electrostatic image in accordance with a predesired intelligence pattern on said belt at said writing station;

moving said belt with said electrostatic image to a developing station;

depositing electrostatic toner upon said belt at said developing station to create a visible display of said image on said belt;

moving said developed image to a third position whereat the display may be perceived by a user;

depositing charge to neutralize the previously formed charge pattern on said belt at a fourth station after said third station so as to enable said previously formed charge pattern to be readily removed from the belt;

surrounding said belt, writing station and developing station in a casing having a transparent wall at said third position to enable said visible display to be viewed by the user;

filling said casing with a gas having a slight overpressure in comparison with atmospheric pressure; and drying said gas.

6. A method in accordance with claim 5, wherein said electrostatic image pattern corresponds to a scanned original document.

7. A method in accordance with claim 5, wherein the electrostatic image is formed as a series of pixels which cover a pattern of colored stripes formed on said dielectric belt, said stripes being of colors corresponding to one of the primary colors, and the resulting pattern thereby forming a colored picture.

8. A method in accordance with 7, wherein said belt extends in a lengthwise and widthwise direction, and the colored stripes are distributed as primary colors adjacent one another such that each stripe extends in the lengthwise direction on said belt.

9. A method in accordance with clam 7, wherein the variation in intensity of the image is obtained by a variation in the deposit of the toner.

10. A method in accordance with clam 7, wherein the electrostatic image formed upon said dielectric is deposited in a pattern determined by the color of each stripe.

* * * * *